E. G. FOX.
Breakwater-Attachments for Utilizing the Force of Waves on Vessels.

No. 155,230.            Patented Sept. 22, 1874.

Witnesses,
Chas H. Smith
Harold Serrell

Inventor
Edward G. Fox.
per L. W. Serrell
atty.

UNITED STATES PATENT OFFICE.

EDWARD G. FOX, OF BROOKLYN, NEW YORK.

IMPROVEMENT IN BREAKWATER ATTACHMENTS FOR UTILIZING THE FORCE OF WAVES ON VESSELS.

Specification forming part of Letters Patent No. 155,230, dated September 22, 1874; application filed June 5, 1874.

*To all whom it may concern:*

Be it known that I, EDWARD G. FOX, of Brooklyn, in the county of Kings and State of New York, have invented an Improvement in Breakwaters for Utilizing the Force of Waves on Vessels, of which the following is a specification:

The concussion of a wave against the bow of a vessel is detrimental to the vessel, and the sudden concussion tends to check the speed.

My invention relates to a yielding breakwater applied to the bow of a vessel to receive the concussion of the waves and protect the vessel, and at the same time the motion that the breakwater receives is availed of for operating the pump that removes the bilge-water or forces air through suitable pipes for ventilating the ship, or exhausts atmosphere from portions of the vessel liable to accumulations of noxious vapors or gases.

Figure 1:
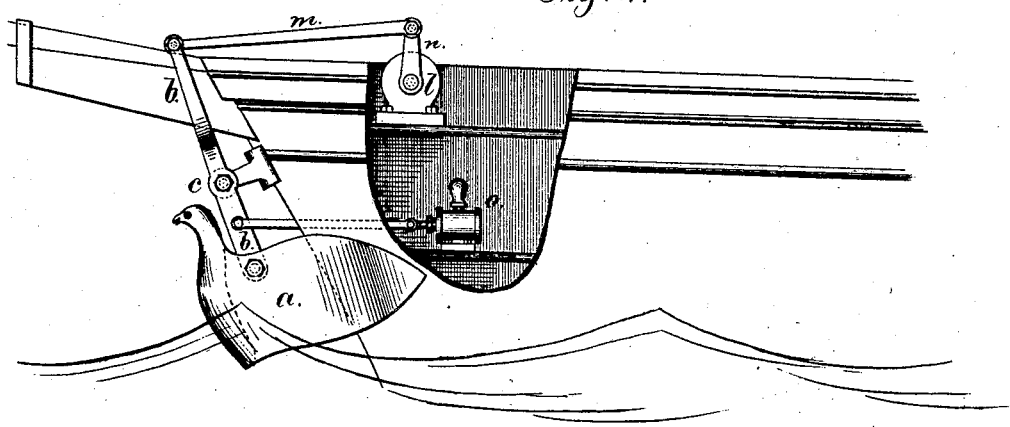
Figure 2:
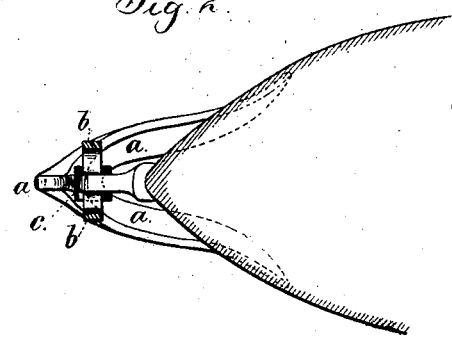

In the drawing, Figure 1 is a side view of the pumping apparatus and section of the breakwater and vessel, and Fig. 2 is a sectional plan representing said breakwater.

The breakwater $a$ is made with a sharp central cut-water, and with side wings, and it is sustained by the vertical, or nearly vertical, lever or bar $b$, that is hinged at $c$, where the parts are attached to the vessel.

It is preferable to make this breakwater adjustable vertically, so that it may be positioned to pass over the quiescent surface of the water, or but slightly enter the water; but when the water is agitated the waves thereof impinge upon the breakwater, and press the same toward the vessel, and as the waves recede the breakwater swings downward and forward by its own weight.

The mechanism for raising and lowering the breakwater may be of any desired character.

The bar $b$ may be slotted, and the breakwater drawn up or allowed to descend by the use of a suitable tackle or fall.

The swinging movement given to the vertical bar or lever is communicated to the pump $l$ by means of the connecting-rods $m$, to the arms $n$ of the pump rock-shaft, or the rods may be connected directly to a piston of a pump, as indicated at $o$, so as to move the same. I remark that the pump may be of any desired character, and applied to any purpose on the vessel for which it is available, and where the pump is between decks the connection may be taken from the vertical lever $b$, below the fulcrum $c$, and the said fulcrum will preferably be upon the stem below the bowsprit; but when the connection to the pump is made above the deck the upper end of the lever $b$ should be forked, so as to pass at each side of the bowsprit, and the rods $m$ pass back from such arms or fork to the levers or arms of the pump.

The pump may be employed for removing bilge-water, or for drawing or forcing air from or to any part of the ship, and in cases of fog the air-pump will be connected, by a pipe, to a fog horn or whistle placed at the mast-head, or in any desired part of the vessel.

I claim as my invention—

The yielding breakwater hanging in front of the vessel's bow, and connected thereto by a lever or bar, $b$, in combination with a pump and the connecting-rods, substantially as and for the purposes set forth.

Signed by me this 29th day of May, A. D. 1874.

EDWARD G. FOX.

Witnesses:
 GEO. T. PINCKNEY,
 GEORGE SERRELL.